United States Patent [19]

Harris

[11] 4,286,496

[45] Sep. 1, 1981

[54] FASTENER GUIDANCE AND RETENTION TIP MEMBER

[75] Inventor: Frederick J. Harris, Clinton, Conn.

[73] Assignee: Olin Corporation, New Haven, Conn.

[21] Appl. No.: 84,283

[22] Filed: Oct. 12, 1979

[51] Int. Cl.³ .............................. F16B 15/00
[52] U.S. Cl. .................... 411/441; 102/532; 411/907; 411/908
[58] Field of Search ............... 85/10 E, 10 R, 8.8, 85/36, 83; 102/93, 94; 151/41.74, 41.73; 227/139

[56] References Cited

U.S. PATENT DOCUMENTS

| | | | |
|---|---|---|---|
| 2,676,508 | 4/1954 | Erickson | 85/10 E |
| 3,137,195 | 6/1964 | Rosenberg, Jr. | 85/10 E |
| 3,362,280 | 1/1968 | Muller | 85/36 X |

OTHER PUBLICATIONS

Omark Industries Catalogue, "The Muscle Tools", 16 pp.

Primary Examiner—Ramon S. Britts
Attorney, Agent, or Firm—William W. Jones; Paul J. Lerner

[57] ABSTRACT

A guidance and retention member, for use with a nail-like fastener of the type adapted to be driven by a powder-actuated tool, comprising an axially elongate, hollow, cylindrical body adapted for telescopic retention on the nose of the fastener and of an even number of flexible, radially extending fins, wherein alternating ones of the fins are of substantially greater radial extent than the fins adjacent thereto. The shorter fins, although nominally of the same thickness as the longer ones, are more rigid by virtue of their lower length-to-thickness ratio and act to limit pre-firing eccentricity of the fastener relative to the tool.

10 Claims, 4 Drawing Figures

U.S. Patent  Sep. 1, 1981  4,286,496
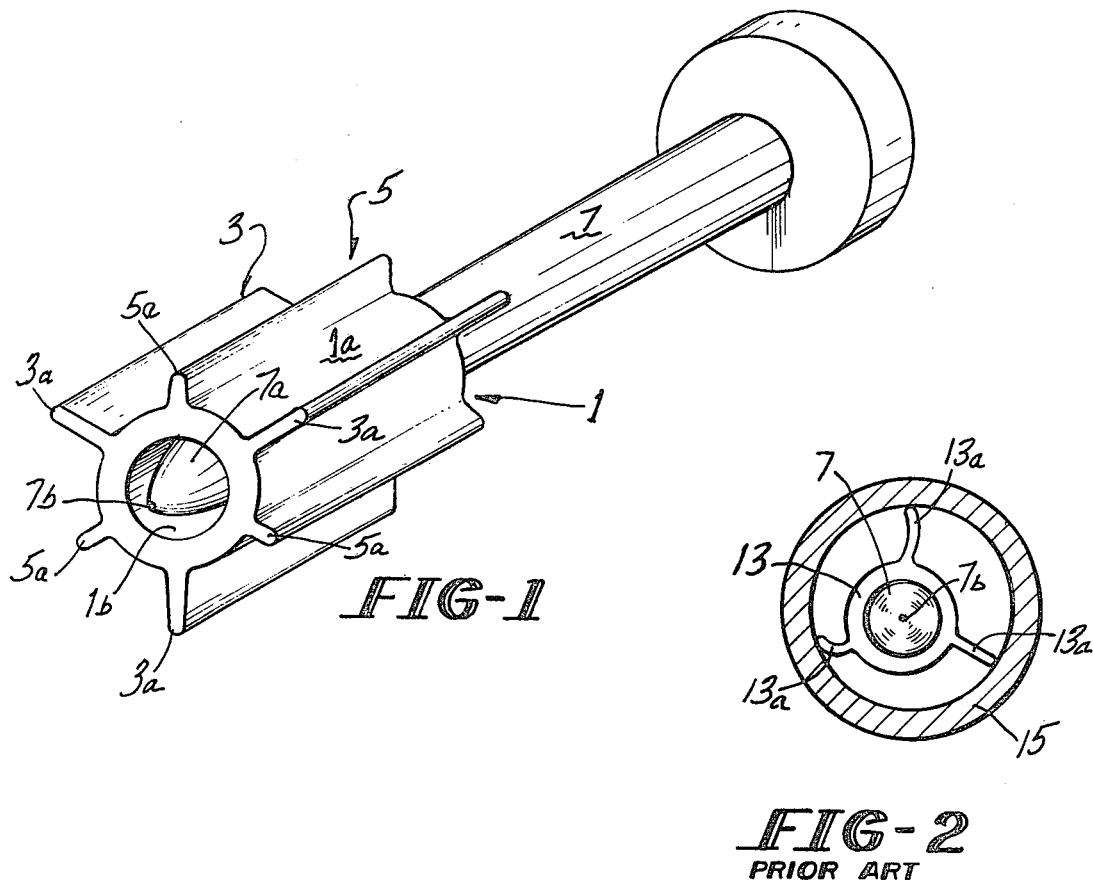
FIG-1
FIG-2
PRIOR ART
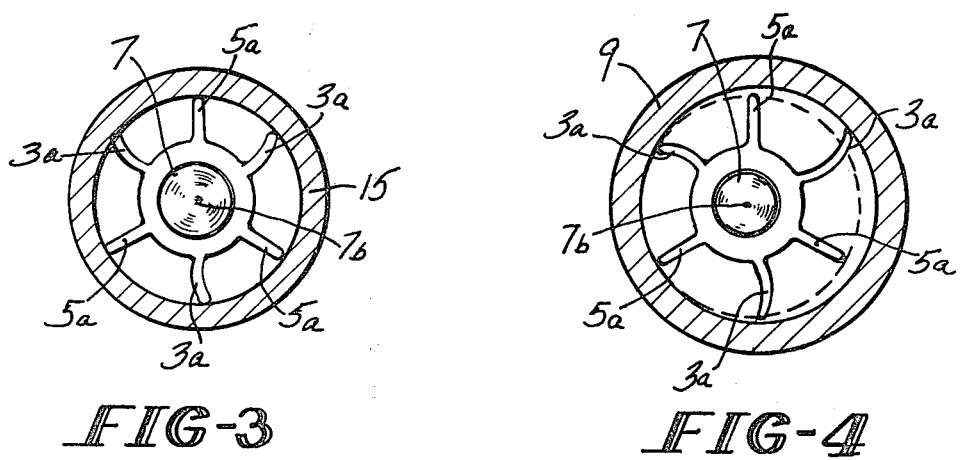
FIG-3
FIG-4

FASTENER GUIDANCE AND RETENTION TIP MEMBER

BACKGROUND AND SUMMARY OF THE INVENTION

The present invention relates to fasteners and, more particularly, to a guidance and retention member for use with a nail-like fastener to be driven by a powder-actuated tool.

When driving nail-like fasteners by means of a powder-actuated tool, it is common practice to utilize a tip member, disposed on the forward or nose end of the fastener, to center and hold the fastener in the tool muzzle bushing prior to setting. One such tip member comprises a hollow, elongate, cylindrical body having a number of flexible, congruent, radially extending fins integrally formed thereon.

Tip members of this general type are presently used extensively in the application described. Such tip members have, however, been found to suffer in that, as the interference of the circumscribed diameter formed by the fins increases relative to the muzzle bushing bore diameter, asymmetric deflection of the fins may occur. This asymmetry causes a degree of eccentricity between the fastener and the driving piston which results in the fastener entering the target at an angle, yielding a poor fastening or even a broken fastener. If the thickness of the individual fins is increased to minimize the deflection thereof, the force required to insert the tip member into the bushing bore is greatly increased, making it undesirable for use in smaller sized tool bores. On the other hand, if the thickness of the individual fins is decreased to accomodate insertion in small bores, then in larger bores, the tip member will be too flexible to provide the necessary support for proper fastener guidance. Further, due to the nature of the elastomeric materials commonly used for tip members, the problem of insertion is significantly increased as the ambient temperature decreases and material stiffness increases.

It is, therefore, a primary object of the present invention to provide a fastener tip member which will offer proper fastener guidance in a range of sizes of muzzle bushing bores, while reducing the force required for insertion of the tip member into the said bore. This is accomplished, in general, by the provision of two sets of fins, the fins of one set being of substantially greater length, or radial extent, than the ones of the other. More specifically, the fins of the shorter set are 40-60% the length of those of the longer set; the fins of both sets being disposed in alternating relation about the outer cylindrical surface of the tip member body. The shorter fins, although nominally of the same thickness as the longer fins, are more rigid by virtue of their lower length-to-thickness ratio. Hence, they act to prevent the fastener point from being deflected off-center of the bushing bore by more than half the difference between the bore diameter and the circumscribed diameter defined by the said shorter fins.

DESCRIPTION OF THE DRAWING

The above and other objects and aspects of the invention, as may hereinafter appear, may be more clearly understood by reference to the following detailed description, the claims, and the drawing, wherein:

FIG. 1 is a perspective view of a tip member, constructed in accord with the present invention, mounted on a fastener;

FIG. 2 is an end plan view of a fastener and conventional tip member disposed in the muzzle bushing bore of a powder-actuated tool;

FIG. 3 is an end plan view similar to FIG. 2, wherein the tip member is in accord with the present invention; and FIG. 4 is an end plan similar to FIG. 3, with the exception that the muzzle bushing bore is of somewhat increased diameter.

DESCRIPTION OF THE PREFERRED EMBODIMENT

As seen in the drawing, the tip member of the present invention consists of a hollow, right circular cylindrical body portion 1 and first and second fin portions, 3 and 5 respectively.

As best seen in FIG. 1, the tip member is adapted for telescopic retention on at least the forward or nose portion 7a of a nail-like fastener 7, with the inner cylindrical surface 1b of the body portion 1 being frictionally engaged therewith. Preferably, the tip member is disposed on a fastener 7 with the fastener point 7b lying in the plane defined by the forward face 1c of the body portion 1, thereby shielding the point 7b and eliminating the possibility of injury to the user during insertion of the tipped fastener into the muzzle bushing of a powder-actuated tool. The length of the body portion 1 is such as to provide an adequate retention force between the tip member and a fastener 7.

Both the first and the second fin portions, 3 and 5, consist of at least three axially elongate fin members, 3a, 3a, 3a and 5a, 5a, 5a respectively, integrally formed on the outer cylindrical surface 1a of the body portion 1 and extending radially thereof for the entire length of the body 1. The fin members 5a, 5a, 5a of the second fin portion 5 are of the same thickness but of substantially lesser length, or radial extent, than those 3a, 3a, 3a of the first fin portion, being about 40-60% the length thereof. The fin members 3a, 3a, 3a, 5a, 5a, 5a are disposed at regular circumferential intervals about the body portion 1, with the fin members 3a, 3a, 3a of the first fin portion 3 alternating with those 5a, 5a, 5a of the second fin portion 5.

The tip member of the present invention is preferably formed of an elastomeric material, such as vinyl, having a hardness of 65-75 durometers as measured on the Shore A scale. It will therefore be appreciated that the tip member, and most especially the fin portions 3 and 5 thereof, is flexible. It is to be noted, however, that while the fin members 3a, 3a, 3a, 5a, 5a, 5a of both fin portions 3 and 5 are of the same nominal thickness, the shorter fin members 5a, 5a, 5a are more rigid than the longer fin members 3a, 3a, 3a by virtue of their lower length-to-thickness ratio. It will be further appreciated that the tip member may be advantageously produced, in quantity, by extruding long members with the desired cross-section and then cutting the same into segments having the desired length.

In FIG. 2, there is shown a nail-like fastener 7 and a conventional tip member 13, having fin members 13a, 13a, 13a all of the same length, inserted in the muzzle bushing 15 of a powder-actuated tool. It is seen that, as may result from a variety of factors, the extent of deflection of the fin members 13a, 13a, 13a is unequal, whereby a degree of eccentricity exists between the fastener 7 and the driving piston (not shown).

In FIG. 3, the conventional tip member 12 has been replaced by one in accord with the present invention. In this instance, the circumscribed diameter defined by the fin members 5a, 5a, 5a of the second fin portion 5 is approximately equal to the diameter of the muzzle bushing bore. The relatively more rigid shorter fin members 5a, 5a, 5a thus are substantially undeformed and serve to retain the fastener 7 properly aligned along the muzzle bushing axis, overcoming any asymmetric forces which might otherwise exist due to variations in the degree of deflection of the longer fin members 3a, 3a, 3a.

In FIG. 4, a fastener 7 and a tip member in accord with the present invention are shown in a muzzle bushing 9 having a bore diameter greater than the circumscribed diameter defined by the shorter fin members 5a, 5a, 5a. In this case, asymmetric deflection of the longer fin members 3a, 3a, 3a has resulted in a degree of eccentricity between the fastener 7 and the driving piston (not shown). Such eccentricity is limited, however, to not more than half of the difference between the muzzle bushing bore diameter and the circumscribed diameter defined by the shorter fin members 5a, 5a, 5a.

While the preferred embodiment of the present invention has been herein disclosed, it is to be understood that this embodiment is given by way of example only and not in a limiting sense, the scope of the invention being determined by the claims.

I claim:

1. In a guidance and retention member for use with a nail-like fastener of the type adapted to be driven by a powder-actuated tool, said member consisting of an axially elongate, hollow, cylindrical body portion, adapted for telescopic retention on at least the forward or nose portion of the fastener, and a plurality of flexible, axially elongate fin members integrally formed on the outer cylindrical surface of said body portion and extending radially thereof at regular circumferential intervals, the improvement comprising: said plurality being an even integer not less than six, with alternating ones of said fin members being of substantially greater radial extent than the fin members adjacent thereto.

2. The invention of claim 1, wherein the shorter of said fins are about 40-60% of the radial extent of the longer of said fins.

3. The invention of claim 1, wherein said guidance and retention member is formed by extrusion of an elastomeric material.

4. The invention of claim 3, wherein said elastomeric material has a hardness of 65-75 durometers on the Shore A scale.

5. A guidance and retention member for use with a nail-like fastener of the type adapted to be driven by a powder-actuated tool, said member comprising an axially elongated, hollow, cylindrical body portion adapted for telescopic retention on the forward or nose end of the fastener, and first and second fin portions, said fin portions consisting of at least three flexible, axially elongate fin members integrally formed on the outer cylindrical surface of said body member and extending radially thereof, said fin members being disposed in regular circumferential intervals, said fin members of said first fin portion alternating with those of said second fin portion and being of substantially greater radial extent than those of said second fin portion, the number of said fins in said first fin portion being equal to said number in said second fin portion.

6. The invention of claim 5, wherein said fin members of said second fin portion are about 40-60% of the radial extent of said fin members of said first fin portion.

7. The invention of claim 5, wherein said guidance and retention member is formed by extrusion of an elastomeric material.

8. The invention of claim 7, wherein said elastomeric material has a hardness of 65-75 durometers on the Shore A scale.

9. The invention of claim 1, wherein said fin members of greater radial extent are substantially more flexible than said fin members adjacent thereto.

10. The invention of claim 5, wherein said fin members of said first fin portion are substantially more flexible than said fin members in said second fin portion.

* * * * *